United States Patent [19]
Loodberg

[11] Patent Number: 6,036,000
[45] Date of Patent: Mar. 14, 2000

[54] CONVEYOR BELT

[76] Inventor: Torsten Loodberg, Domarringsvägen 16, 260 41 Nyhamsläge, Sweden

[21] Appl. No.: 09/198,481

[22] Filed: Nov. 24, 1998

Related U.S. Application Data

[63] Continuation of application No. PCT/SE97/00938, May 30, 1997.

[30] Foreign Application Priority Data

May 31, 1996 [SE] Sweden .................................. 9602126

[51] Int. Cl.[7] .................................................. B65G 15/08
[52] U.S. Cl. ........................... 198/819; 198/820; 198/821
[58] Field of Search .................................... 198/818, 819, 198/820, 821

[56] References Cited

U.S. PATENT DOCUMENTS

| | | | |
|---|---|---|---|
| 3,164,238 | 1/1965 | McCullagh | 198/819 |
| 4,410,082 | 10/1983 | McGinnis | 198/818 |

FOREIGN PATENT DOCUMENTS

| | | |
|---|---|---|
| 42 13 645 | 10/1993 | Germany . |
| 43 02 214 | 7/1994 | Germany . |
| 445 337 | 6/1986 | Sweden . |
| 2 205 543 | 12/1988 | United Kingdom . |
| 87/03565 | 6/1987 | WIPO . |
| 90/03930 | 4/1990 | WIPO . |

*Primary Examiner*—Christopher P. Ellis
*Assistant Examiner*—Gene O. Crawford
*Attorney, Agent, or Firm*—Browdy and Neimark

[57] ABSTRACT

A conveyor belt (1) for conveying goods in solid or liquid state comprises a goods-carrying endless element (2), which is made of an elastic material, and a single belt-supporting wire (4), which is fixedly connected to one lateral edge (3) of the endless element. The endless element (2) has in cross section and in its unloaded state essentially the form of a hook for forming a goods-receiving space. It is sufficiently rigid in the transverse direction of the conveyor belt so as to essentially retain the hook shape when conveying goods in the goods-receiving space.

10 Claims, 3 Drawing Sheets

6,036,000

CONVEYOR BELT

This is a continuation application of PCT application PCT/SE97/00938 filed May 30, 1997 and now published as PCT publication No. 97/45342 Dec. 4, 1997.

BACKGROUND OF THE INVENTION

1. Technical Filed of the Invention

The present invention relates to a conveyor belt for conveying goods in solid or liquid state, said conveyor belt comprising a goods-carrying endless element made of an elastic material, and a single belt-supporting wire which is fixedly connected to one lateral edge of the endless element.

2. Prior Art

There are prior-art conveyor belts comprising a goods-supporting endless element, which is made of an elastic material and on which one or more force-absorbing wires are arranged. This wire or these wires is/are intended for guiding and supporting the conveyor belt by means of rollers, which determine the path of the conveyor belt. Owing to the elastic material of the conveyor belt, this type of conveyor belt requires a high flexibility, which, for instance, facilitates the manufacture of belt conveyors with a plurality of changes of direction along the conveying path.

United Kingdom Patent No. GB-A-2,205,543 discloses e.g. a conveyor belt, which comprises a goods-carrying endless element made of an elastic material, and a single belt-supporting wire which is arranged along one lateral edge of the endless element. The other lateral edge of the endless element is pre-bent to allow it to be hooked over said one lateral edge of the endless element with a force-absorbing wire. This results in a closed space for conveyance of goods. This known construction requires a great distance between the support rollers and unhooking of the other lateral edge from the force-absorbing wire to allow emptying of the goods. The loading and emptying procedure will thus be complicated in this known type of conveyor belt.

OBJECT AND SUMMARY OF THE INVENTION

The object of the present invention is to provide a conveyor belt having the same flexibility as the prior art conveyor belts of the type stated by way of introduction, but at the same time reducing the drawbacks connected with the prior-art conveyor belts. A further object of the present invention is to provide a very simple conveyor belt, which may be designed for both open and closed conveyance of goods in solid or liquid state.

According to the invention, the endless element thus is designed such that an end view of which in its unloaded state, i.e. when not affected by any external forces, has the form of a hook for forming a goods-receiving space. Moreover, the endless element should have sufficient rigidity in the transverse direction of the conveyor belt in order to essentially retain the hook shape when conveying goods in the goods-receiving space, the other lateral edge of the endless element being essentially free, i.e. not serving any belt-supporting purpose by direct coaction with support or guide rollers. This design makes it possible to provide a belt conveyor, which in addition to the conveyor belt requires a very small number of support rollers, which coact with the force-absorbing wire, while loading of goods into the conveyor belt and unloading of goods from the conveyor belt can be carried out very easily.

In an embodiment of the conveyor belt according to the invention, the hook shape is essentially open in the unloaded state of the conveyor belt. This may be advantageous, for instance, when conveying goods in solid state, which may then be loaded into the goods-receiving space of the conveyor belt in essentially arbitrary points along the conveying path.

When a closed conveyance of goods is desirable, the inventive conveyor belt can, as an alternative, in one embodiment have a hook shape, which is essentially closed in the unloaded state of the conveyor belt. With this design, it will be possible to easily effect conveyance of goods in other directions than purely horizontal.

The closed hook shape can be achieved by a suitable design of the endless element. A reinforcement of the closure can be achieved by the other lateral edge of the endless element being provided with a reinforcing element, e.g. a wire, which like the force-absorbing wire can be integrated with the conveyor belt and formed of or surrounded by the material thereof.

If the other lateral edge of the endless element has a reinforcement with a small degree of extensibility in the longitudinal direction of the conveyor belt than the elastic material, such a conveyor belt with an open hook shape can be closed by being twisted around its longitudinal direction, i.e. said reinforcement is achieved.

BRIEF DESCRIPTION OF THE INVENTION

The invention will now be described in more detail for the purpose of exemplification with reference to the accompanying drawings.

DETAILED EMBODIMENT OF THE INVENTION

Figure 1:
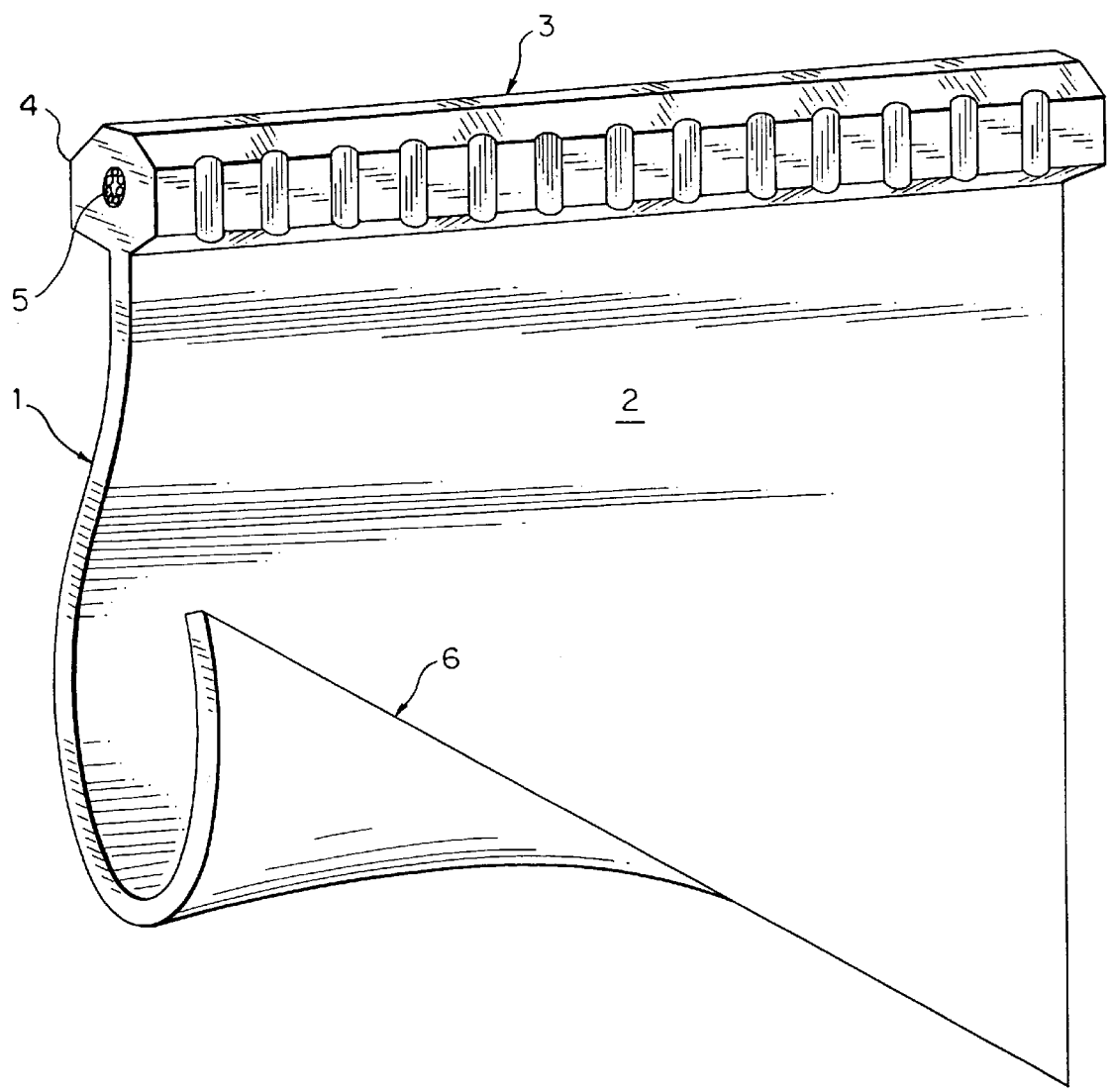
FIG. 1 is a perspective view of a longitudinal part of an embodiment of the conveyor belt according to the present invention.

The embodiment of a conveyor belt 1 according to the present invention as shown in FIG. 1 comprises an elastic belt element 2 an end view of which in the unloaded state of the conveyor belt 1 has a hook shape which is illustrated in the front part of the conveyor belt 1 in the perspective view, i.e. about the same shape as an inverted question mark. By being affected from outside, the belt element 2 can be straightened to an essentially rectilinear shape, as illustrated in the rear part of the perspective view in FIG. 1.

At its upper lateral edge 3, the conveyor belt 1 is formed as a force-absorbing wire 4, which is integrated with the lateral edge 3 of the belt element 2. The force-absorbing wire 4 (lateral edge 3) can be made of the same material as the belt element 2 and only have a greater thickness than this, i.e. constitute an expanded part of the goods-receiving endless element 2, but the wire 4 must be relatively non-extensible in its longitudinal direction to be able to serve as force absorber and belt carrier. The wire 4 (lateral edge 3) may also have a central reinforcement 5 in the form of a cord or the like, such that the entire tensile force acting on and the tension in the conveyor belt 1 are received by the central reinforcement 5 and the wire 4/lateral edge 3, respectively. As shown in FIG. 1, the wire 4 can as to its exterior, have the shape of two V-belts arranged back to back to facilitate symmetrical engagement with roller for supporting the conveyor belt 1 and guiding the path of travel thereof. The V-belts in FIG. 1, which are fixedly interconnected back to back, may be toothed at their narrower portion, as shown in FIG. 1, thereby facilitating the bending of the conveyor belt 1 through curves.

The belt element 2, which can be made of such an elastic material as plastic or rubber, has, however, sufficient rigidity in the transverse direction of the conveyor belt for essentially retaining, in its unloaded and also in its goods-carrying state, the shape as shown in the front part of the perspective view in FIG. 1.

FIGS. 2–7 show some different embodiments of the conveyor belt 1, the wire 4'/lateral edge 3' being shown as a single V-belt. All elements shown in the embodiments of FIGS. 2–7 that are identical to those of the embodiment of FIG. 1 are numbered the same as in FIG. 1. Otherwise, the conveyor belt 21 shown in FIG. 2 corresponds to that shown in FIG. 1. The conveyor belt 31 shown in FIG. 3 differs only from that in FIG. 2 by being in its unloaded state closed owing to the other longitudinal edge 6 of the conveyor belt 31 engaging one side of the conveyor belt 31.

Figure 2:
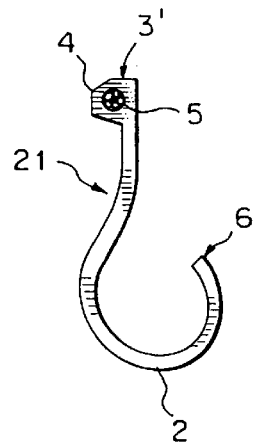
FIGS. 2–7 are sectional views of various embodiments of a conveyor belt according to the present invention.
Figure 4:
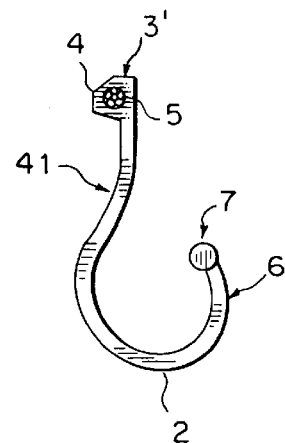

The embodiment if FIG. 4 conforms with the embodiment in FIG. 2 with the difference that an edge reinforcement 7 is arranged at the other longitudinal edge 6 of the conveyor belt 41. This edge reinforcement 7 is not intended to coact with rollers, which support or guide the conveyor belt 41, but may be used to establish a closure of the belt by twisting it around it longitudinal direction. An example of such use is shown with the aid of the conveyor in FIG. 9. The edge reinforcement 7 need not have a greater thickness than the belt element 42 and can, in its simplest form, constitute a wearing edge, i.e. have a greater capacity of resistance to wear than the belt element 42.

Figure 3:
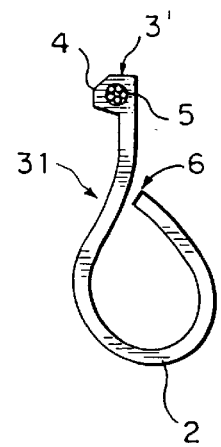
Figure 5:
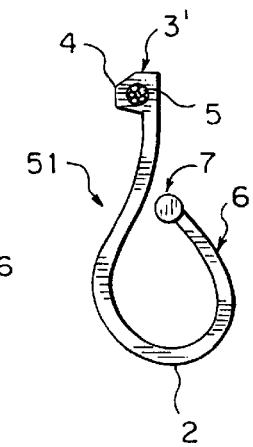

The conveyor belt 51 shown in FIG. 5 conforms with the one in FIG. 3, but also has the edge reinforcement 7 at its longitudinal edge 6. This embodiment results in a slightly better closure of the belt along belt portions where the conveyor belt 51 is not twisted around its own longitudinal direction.

It will be appreciated that loading of goods into the conveyor belt can take place without the shape of the conveyor belt 1 being affected, if this is of the type illustrated in FIG. 2 or 4. For loading of goods into a conveyor belt 31, 51 of the type as shown in FIG. 3 or 5 a filling device is required, which opens the conveyor belt 31, 51 at the other longitudinal edge 6 thereof, thereby obtaining a passage down into the goods-receiving space of the conveyor belt 31, 51, and for the feeding of the goods through the passage it is possible to use e.g. a hopper.

Figure 6:
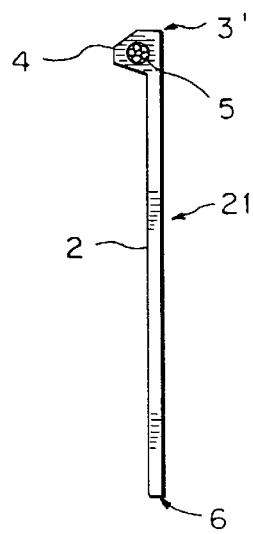
Figure 7:
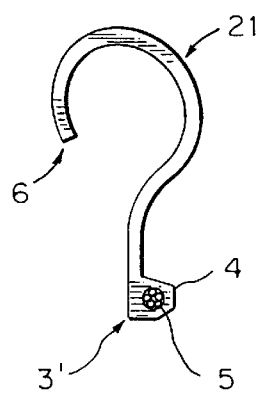

For emptying the conveyor belt 1 of its goods, it can either be stretched in the manner shown in FIG. 6 or be guided to an inverted position, as shown FIG. 7.

Figure 8:
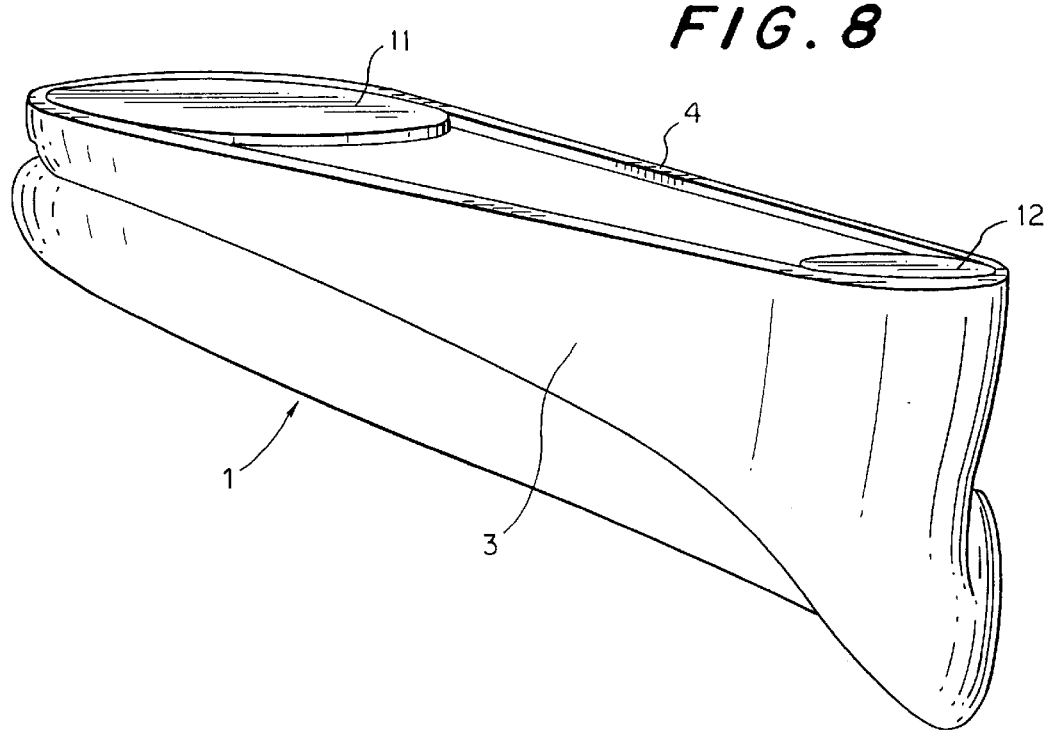
FIG. 8 is a perspective view of a belt conveyor, which employs a conveyor belt according to the present invention.

FIG. 8 shows a very simple belt conveyor with two deflection rollers 11 and 12, by means of which a straight goods-conveying path is provided from the roller 11 to the roller 12 and a straight return path from the roller 12 to the roller 11. By giving the roller 12 a sufficiently small diameter, the conveyor belt 1 can be made to retain an essentially completely straightened shape when passing round the roller 12. Thus, automatic emptying of goods is achieved when the belt has reached the roller 12.

Such emptying of the conveyor belt 1 as show in FIG. 8 places relatively high demands on the material of the conveyor belt 1 owing to its being straightened and bent together repeatedly. By instead turning the conveyor belt upside down a mode of emptying is achieved, which placed considerably lower demands on the material of the conveyor belt 1. For instance, the conveyor belt 1 can then be made by extrusion of some suitable plastic material, which can make the conveyor belt 1 extremely cheap. Emptying the conveyor belt by turning it upside down certainly also results in an increase of the life of the conveyor belt 1.

Figure 9:
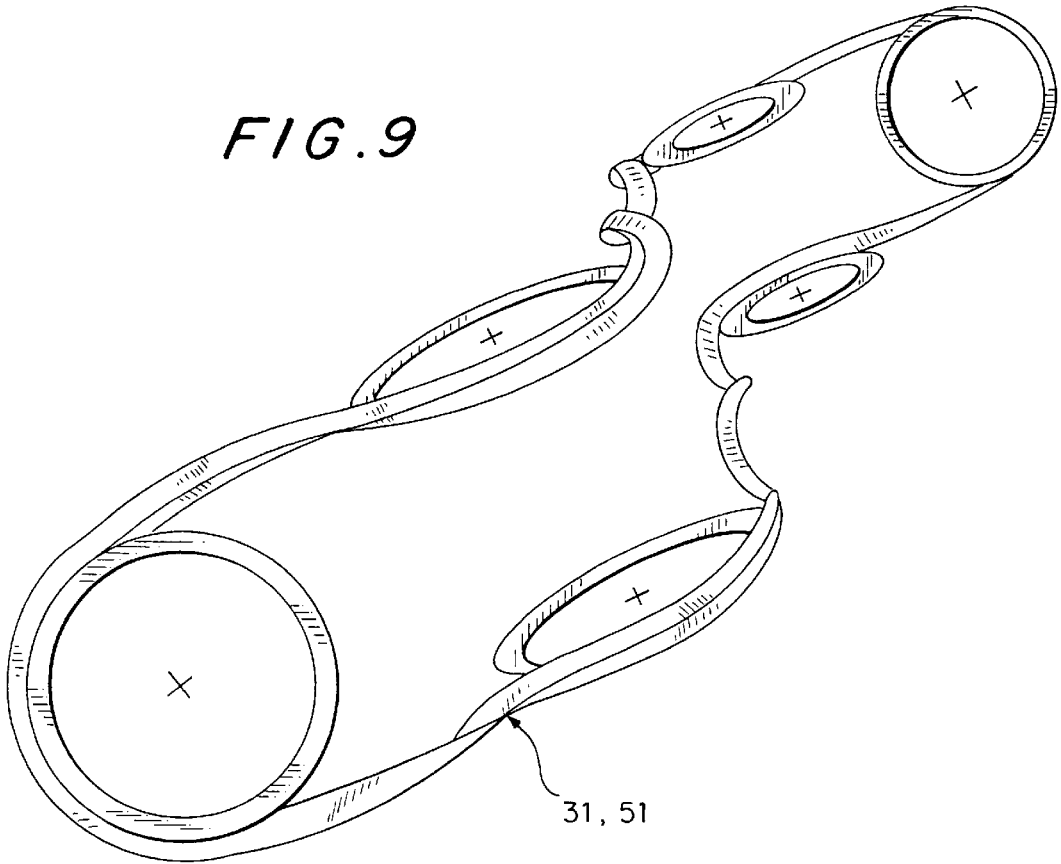
FIG. 9 is a perspective view of another belt conveyor, which employs a conveyor belt according to another embodiment of the present invention.

The conveyor belt shown in FIG. 9 utilizes a conveyor belt 31 or 51 as shown in FIGS. 3 or 5. With a view to determining the path of the conveyor belt 31 or 51 in FIG. 9 use is made of a plurality of rollers having a relatively large diameter, and the conveyor belt 31 or 51 is twisted around its longitudinal direction in the portions between the rollers. When the conveyor belt 31 or 51 according to FIGS. 3 or 5 is twisted around its longitudinal axis, the lateral edge 3/wire and central inforcement 5, the edge 6 and the edge reinforcement 7 will be twisted together like the strands of a rope, thereby establishing a seal and obtaining a completely closed goods-receiving space. In this state, bulk goods can also be conveyed vertically. In fact, the conveyed goods rotate around the longitudinal axis of the conveyor belt 31 or 51 and are pressed out by the centrifugal force towards the bottom of the hook. Even if the belt is positioned upside down, the goods will not lie against the seal formed by the edge reinforcement 7, or edge 6. For emptying the conveyor belt, use can in this case be made of a straight stretch, where the belt is not twisted but travels open upside down. In this position the belt opens quite automatically.

The central reinforcement 5 should be designed so as to be stretched to about the same extent as the wire 4, but does not come into contact with the wire even when the conveyor belt is twisted.

The material of the belt element 2 must be able to stretch so as not to absorb tensile forces in the longitudinal direction of the conveyor belt 1, 21, 31, 41, 51. All support and guide rollers should be in engagement with the lateral edge 3 including wire 4 and central reinforcement 5, only. If, as shown in FIG. 1, lateral edge 3 has the shape of two V belts which are inverted towards the back, it is easy to twist it both in right and left turns, to find room for strands for suspension rollers and to let it enter guide rollers. All external forces on the conveyor belt 1 are exerted via the wire 4, and owing to the symmetrical appearance of lateral edge 3, the same type of support and guide rollers can be used on both sides thereof.

It is important that the central reinforcement 5 is located in the center of the wire 4, such that the symmetry makes it equally easy to twist the conveyor belt 1, 21, 31, 41, 51 to the right and to the left. When bending the external edge 3, sideways, it is desirable for it to be narrow, such that the stretching of the material of the included wire 4 in the outer curve does not become too great. For supporting the conveyor belt 1, 21, 31, 41, 51, it is on the other hand advantageous if the wire lateral edge 3, has as wide a profile as possible since gravitational and centrifugal forces are to be absorbed by the lower surfaces of the lateral edge profile on both sides of the handling belt element 2. One possibility is then, as shown in FIG. 1, that the narrow sides of the lateral edge 3 facing away from the belt element 2 are toothed.

As described above, the emptying of the belt can be carried out in various ways. The simplest way is to empty the belt adjacent to such a small terminal roller as the deflection roller 12 in FIG. 8. If emptying is to take place along a straight stretch, the same principle can be applied. Then two deflection rollers are used, the positioning thereof being such that the conveyor belt follows an S-shaped path, which can extend either in the horizontal plane or in the vertical plane.

A number of modifications of the described embodiments are obviously possible within the scope of the invention as defined by the appended claims.

The invention claimed is:

1. A conveyor belt for conveying goods in solid or liquid state, said conveyor belt comprising a goods-carrying endless element (2) made of an elastic material having an unloaded state and a loaded state, and a single belt-supporting wire (4) which is fixedly connected to a first lateral edge (3) of the endless element, a second lateral edge (6) of the endless element being free, wherein the endless element (2), in cross section and in the unloaded state, essentially has a hook shape forming a goods-receiving space, and the endless element is sufficiently rigid to essentially retain the hook shape when conveying the goods in the goods-receiving space.

2. A conveyor belt as claimed in claim 1, wherein the hook shape is essentially open in the unloaded state.

3. A conveyor belt as claimed in claim 1, wherein the hook shape is essentially closed in the unloaded state.

4. A conveyor belt as claimed in claim 1, wherein the wire (4) is an expanded part of the goods-carrying endless element (2).

5. A conveyor belt as claimed in claim 1, wherein said second lateral edge (6) of the endless element (2) has a reinforcing element (7).

6. A conveyor belt as claimed in claim 1, wherein the conveyor belt is made of rubber or plastic.

7. A conveyor belt as claimed in claim 1, wherein the wire (4) has a reinforcement (5) which is integrated with the conveyor belt and surrounded by the material thereof.

8. A conveyor belt as claimed in claim 7, wherein the wire (4) has a shape adapted to coact with support and guide rollers.

9. A conveyor belt as claimed in claim 8, wherein a cross section of the wire (4) is in a form of two V-belts fixedly interconnected back to back.

10. A conveyor belt as claimed in claim 9, wherein the reinforcement (5) is symmetrically positioned in the wire (4).

* * * * *